March 13, 1962 C. K. STILLWAGON 3,024,802
DISC VALVE
Filed Nov. 12, 1959 3 Sheets-Sheet 2
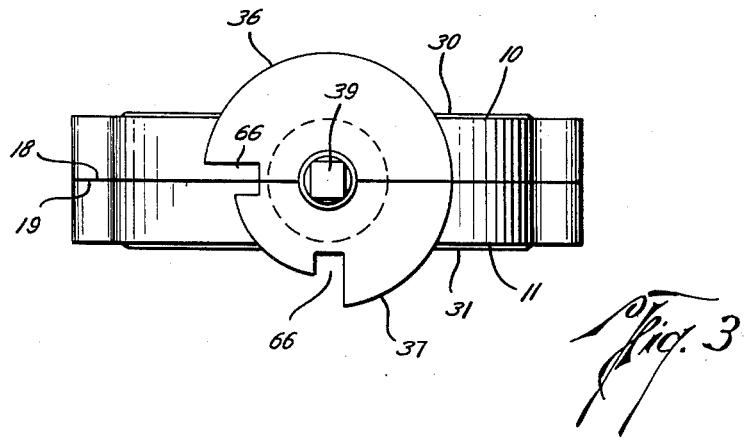
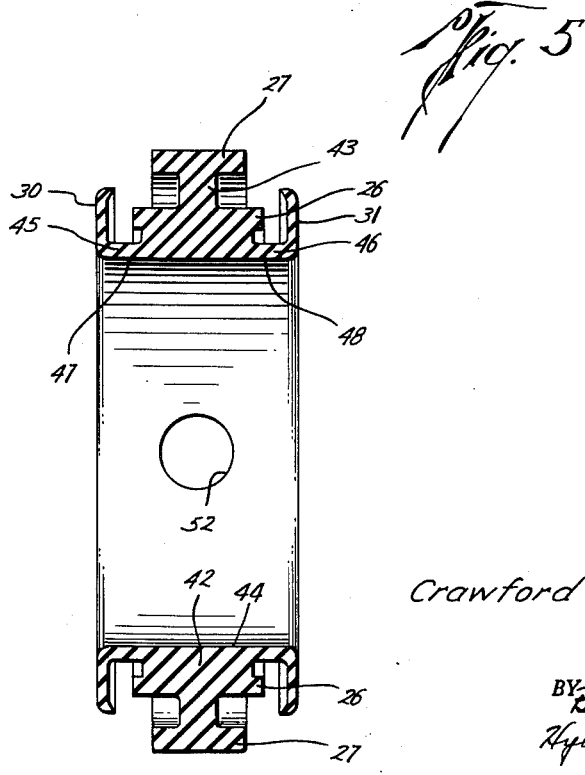
Crawford K. Stillwagon
INVENTOR.
BY Browning, Simms,
Hyer & Eickenroht
ATTORNEYS

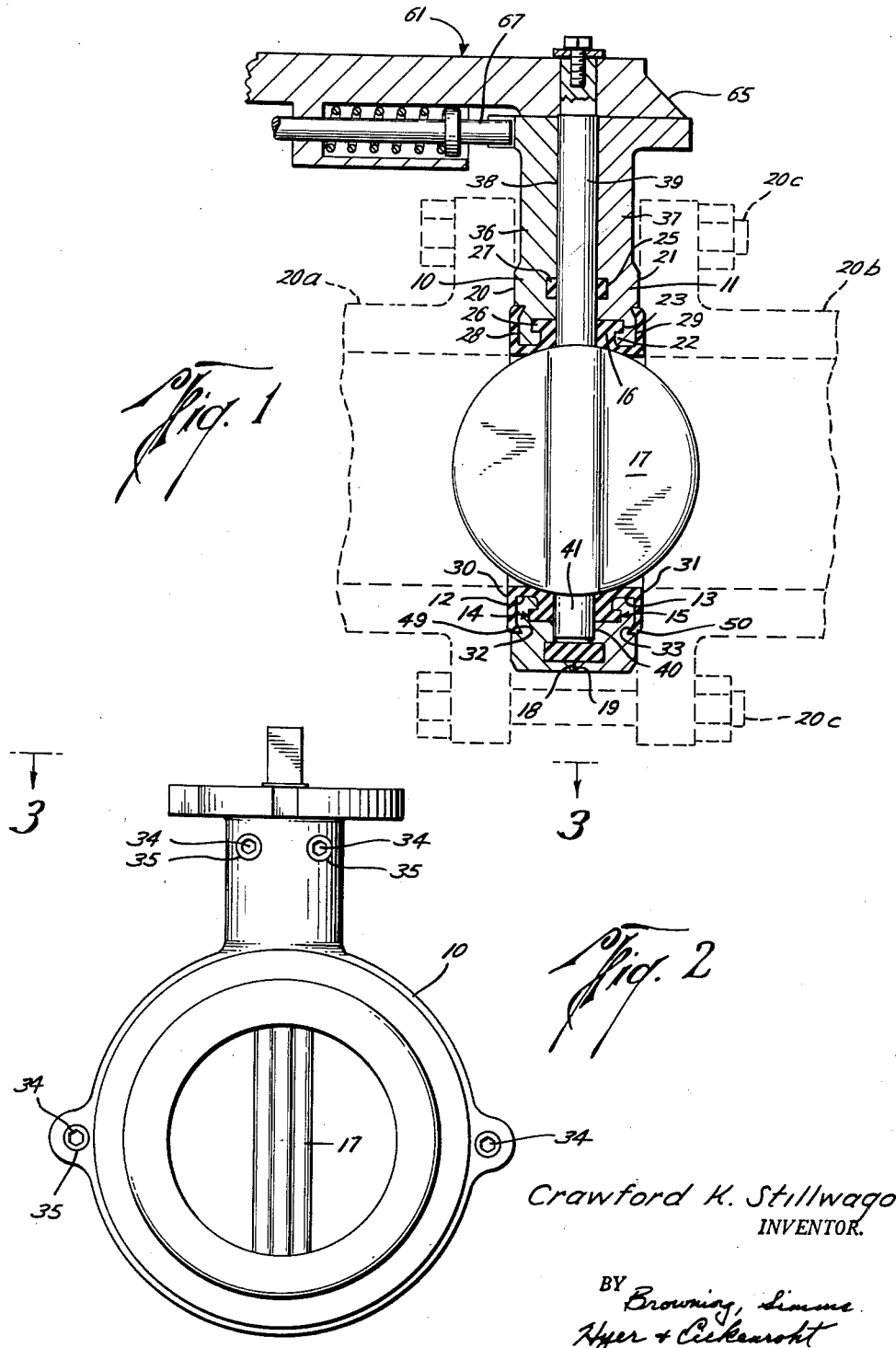

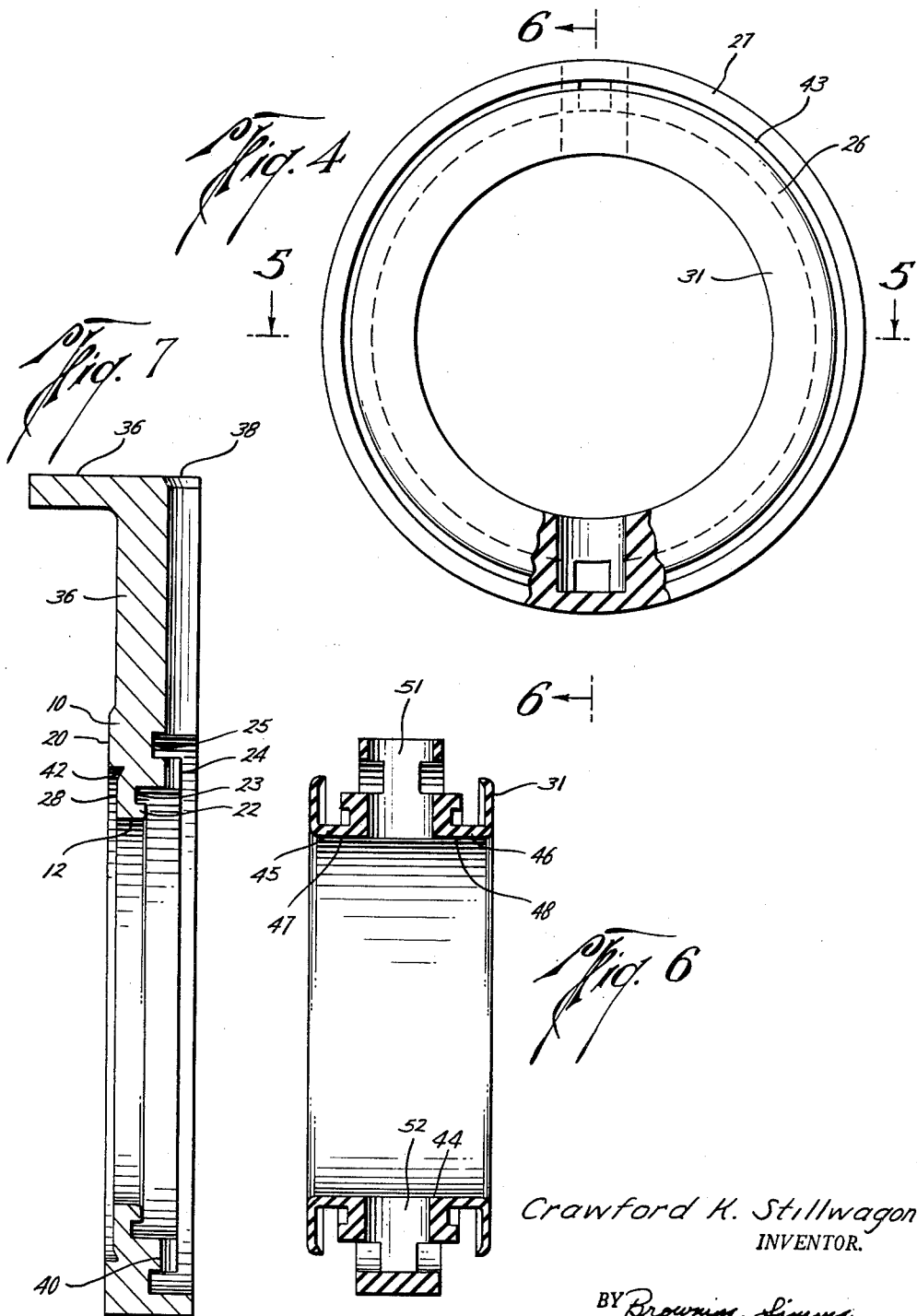

United States Patent Office 3,024,802
Patented Mar. 13, 1962

3,024,802
DISC VALVE
Crawford K. Stillwagon, 5325 Kirby Drive, Houston, Tex.
Filed Nov. 12, 1959, Ser. No. 852,300
1 Claim. (Cl. 137—375)

This invention relates to valves and more particularly, to valves of the type known as disc or butterfly valves, and is an improvement over the valve of my application Serial No. 487,588, filed February 11, 1955, and entitled "Valve," now Patent No. 2,912,218, issued Nov. 10, 1959.

In disc valves having a unitary body, it is necessary to form the valve stem and disc in two parts so that the stem and disc may first be positioned in the valve body and then secured together to form an operating member for controlling flow through the valve. My valve shown and claimed in the patent Stillwagon 2,740,423 is representative of this general type of disc valve. In that valve, the valve seat in its full thickness extends the entire distance between and somewhat beyond the ends of the body and has heavy anchoring flanges or beads extending radially and disposed in annular spaces or recesses formed in the body ends. It provides a continuous liner for the passageway through the valve body, and in addition to cooperating with the disc to control flow through the valve, seals around the valve stem and between the valve body and the flanges. However, the cracks and crevices between the stem and disc units of this type of valve provide spaces wherein the material being passed through the valve may lodge and become trapped. This situation is not only undesirable, but may even be dangerous in some applications. For example, in handling nitroglycerin, if any of the nitroglycerin is trapped in the cracks between the stem and disc, it may explode when the valve is disassembled and cause serious injury or even death. In the transmission of food stuffs and other perishables, the entrained material may spoil and thereby contaminate the other material being passed through the valve.

It is therefore desirable to provide a split-body valve to permit the use of a unitary stem and disc unit which is free from cracks and crevices. However, it was discovered that if the valve body is divided into two parts and a resilient member is used for the valve seat which also seals between the two parts of the valve body, the bore through the resilient member is unsupported when the valve is open. When on suction service, the pressure differential across the the seal element will tend to reduce the diameter of the bore through the element constricting flow, and under a large differential the seat may permit leakage or may collapse and pull out of the socket entirely.

These difficulties were obviated by my valve disclosed in the above mentioned Patent No. 2,912,218 wherein the valve seat is anchored in the valve body at its ends and also at a point intermediate its ends against radial movement. This valve not only solved the above noted difficulties, but also provided other advantages. For example, a double seal is provided between the body parts against passage of fluid between the parts. Also a double seal about the stem is provided. However, in order to make the seat adaptable to the split body used in that valve it was necessary to eliminate the heavy anchoring flanges or beads of Patent No. 2,740,423 and provide the end anchors for the seat by axially extending projections on the opposite ends of the seat extending into undercut portions in the adjacent faces of the body parts.

Although the valve of said Patent No. 2,912,218 permitted the use of a unitary valve and stem unit and solved the above noted difficulties encountered in a split-body valve, it was discovered that this valve has certain inherent features and characteristics which make it less desirable for use in some applications. For example, the seat forms only a portion of the flow passageway through the valve. This construction permits cracks and crevices between the seat and the body parts. Thus while the cracks between the stem and disc units of the valve in Patent No. 2,740,423 were eliminated, other cracks were brought about in the later valve which did not occur in the patented valve. In addition, it was discovered that the valve of Patent No. 2,912,218 may be difficult to operate under some circumstances. This situation is caused by the bunching or pinching of a portion of the resilient valve seat between the disc and body parts when the valve is operated. This pinching of the valve seat and resulting resistance to movement of the valve disc did not occur in the unitary body valve of Patent No. 2,740,423.

Accordingly, an object of this invention is to provide a valve of the type described which will obviate the above difficulties and disadvantages.

Another object of the invention is to provide a completely lined split-body valve having a unitary stem and disc unit and having a valve seat centrally anchored against radial movement and anchored at its ends against axial movement to prevent pinching the valve seat between the disc and body parts when the valve is operated.

Another object of the invention is to provide a disc valve of the type shown in my Patent No. 2,912,218, above referred to, which retains the advantages of such a valve and obviates the disadvantages therein.

Another object of the invention is to provide a completely lined disc valve, the body being divided into two parts in a plane substantially at right angles to the passageway through the body to permit use of a unitary stem and disc unit for controlling flow through the valve, and the valve seat being anchored near its ends and intermediate its ends against radial movement inwardly toward the passageway and further anchored at its ends against axial movement along the passageway to prevent pinching of the valve seat between the disc and body parts when the valve is operated, yet in which the end anchoring parts of the seat will not prevent it from being assembled in the two part body.

Other objects and advantages are inherent and will become apparent upon consideration of the specification, claims and attached drawings.

Referring now to the drawings, wherein one embodiment of the invention is shown and wherein like characters are used to designate like parts:

FIG. 1 is a view in cross section through a valve embodying this invention with only a portion of the actuator handle being shown and the flange fittings for mounting the valve in a flow line shown in dotted lines;

FIG. 2 is a view in end elevation of the valve of FIG. 1 with the handle omitted;

FIG. 3 is a view of the valve of FIG. 2 taken along the lines 3—3 of FIG. 2;

FIG. 4 is a view in end elevation of the resilient seal element of the valve parts being broken away and shown in cross section for purposes of illustration;

FIG. 5 is a view in cross section through the seal element taken along lines 5—5 of FIG. 4;

FIG. 6 is a view in cross section through the seal element taken along lines 6—6 of FIG. 4; and, FIG. 7 is a view in cross section of the left body part of FIG. 1.

As illustrated in the attached drawings and described in detail below, the valve of my Patent No. 2,912,218 is improved and the foregoing objects accomplished according to this invention by providing, instead of the heavy anchoring flanges or beads of Patent No. 2,740,423 a resilient tubular membrane much thinner than the disc receiving portion of the seat integrally formed with the valve seat and extending from the seat axially along the passageway through the valve and then radially outwardly along the outer faces of the body parts. This membrane, being much more flexible relative to the body of the seat than the heavy anchoring flanges or beads of Patent No. 2,740,423, does not prevent assembly with the split two-part body. The membrane, being thin, probably would not alone adequately anchor the seat against radially inward movement. However, the seat and membrane together provide a seat unit which can be readily assembled with a valve body divided into two parts along a surface transverse to the flow passageway to provide a valve with a seat anchored centrally and at both ends of the body. Also, the seat and membrane together form an essentially continuous liner along the entire passageway through the valve, and the bore through the membrane and seat taken together comprise one continuous bore through an integral body whereby such bore defines the entire flow passageway through the valve, the bore being free from cracks and crevices. The radially outwardly extending portions of the membrane provide gasket portions for providing a seal between the valve and mounting flanges when the valve is made up in a flow line. In addition to its lining and sealing functions, the membrane serves to anchor the valve seat against endwise movement to prevent pinching of the seat between the disc and body parts.

Referring now to the drawings, the valve body is divided into parts 10 and 11 along a plane extending across the flow passageway and preferably at an angle normal to the flow passageway, parts 10 and 11 being provided with registering bores 12 and 13, respectively, which forms said flow passageway through the body.

Body parts 10 and 11 have confronting recesses, indicated generally at 14 and 15, which together from an annular socket in which there is positioned a resilient element 16 which seals between the two body parts and provides a valve seat. A valve disc 17 is mounted for cooperation with the seat portion of element 16 to control flow through the valve.

The radially outer portions of the opposed surfaces of the body parts surrounding the annular socket provides inner abutment faces 18 and 19. Parts 10 and 11 are further provided with outer abutment faces 20 and 21, respectively, which are adapted to abut flange fittings 20a and 20b to connect the valve into a flow line. The flange fittings may be the same or may be dissimilar fittings, depending upon the application in any particular case.

Recesses 14 and 15 in body parts 10 and 11, respectively, provide radially inner portions of the opposed surfaces of these body parts which are separated apart to form an annular recess in the assembled body. The body surfaces within these recesses adjacent the portions of the bodies which actually abut each other form the outermost walls or outer extremities of the recesses. The recesses are preferably formed with a system of identical opposing, but spaced apart, lands and grooves to anchor seal element 16 in the socket, with the seal element sealing against passage of fluid between the two pieces of the body. The recesses extend circumferentially around the passageway through the body and open into the passageway at their inner extremities so that the element 16 will be exposed to the passageway and function as a valve seat. The locus of the opening of the recesses into the passageway through the valve may also be termed the innermost extremities of the recesses.

Beginning at the passageway and proceeding radially outwardly therefrom, each recess is provided with a land 22 extending outwardly from the inner extremity of the recess, then a groove 23, a second land 24, and then a second groove 25. The outer or radially inwardly facing walls of grooves 25 join each other and form the outermost wall or extremity of the recesses. The axial distance between lands 22 is such as to provide the necessary axial space for a valve seat.

Grooves 23 are spaced apart a greater distance than lands 22 so as to provide undercut surfaces in the body to receive endwise flange portions 26 of the seal element to anchor the ends of the seal element in the socket against radially inward movement. The bottoms of grooves 25 are likewise spaced apart a greater distance than the distance between lands 24 so as to provide undercut surfaces for receiving an anchoring portion 27 of the seal element. Lands 24 are somewhat closer together than lands 22 and cooperate with anchor 27 to anchor intermediate portions of seal 16 in the body. In other words, these lands and grooves are continuous and anchor the seal at all points about the bore through the seal adjacent the interface of the body parts. With this arrangement, seal 16 is anchored near both ends and at an intermediate point against radial movement and there is no danger of the seal escaping from its socket when the valve is on suction service.

Recesses 28 and 29 in outer abutment faces 20 and 21 of body parts 10 and 11, respectively, provide radially outwardly extending portions of these body parts and extend circumferentially around the passageway through the body and open into the passageway at their inner extremities. These recesses provide a space between the body parts and flanges when the valve is made up in a flow line and are adapted to receive the gasket elements 30 and 31 which form part of and are integral with seal element 16. The grooves 32 and 33 at the radially outer extremities of these recesses provide anchor points for the outer lip portions 49 and 50 of these gasket elements.

Body parts 10 and 11 are provided with radially extending neck parts 36 and 37, respectively, for receiving a valve stem 39 associated with disc 17. Each of the body parts has formed therein one-half of a radially extending bore 38 for receiving valve stem 39. Bore 38 is bisected by abutment faces 18 and 19 so that the stem may be moved laterally into each of the half bores when the valve body is made up. A similar bore 40 is formed in lands 24 to receive a stub shaft 41 carried by the disc member on the opposite side from stem 39. Bores 38 and 40 are axially aligned and serve as bushings for the valve stem and hold it in the desired position in the valve body.

Disc valve element 17 cooperates with bore 44 through seal element 42 to control flow through the valve. The disc, stem 39 and stub shaft 41 are an integral unit and are formed so as to be free of cracks and crevices. This integral unit is made possible by the two-part body construction and not only eliminates areas where material may become trapped, but also eliminates the possibility of leakage between the disc and stem. Disc 17 is formed on a diameter which is preferably slightly larger than the diameter of bore 44 in the seal element 42 so that it will engage the seat element as it is closed and form a complete seal therewith.

It will be noted from FIG. 1 that stub shaft 41 terminates short of the radially outermost portion of seal element 16, that is, anchoring portion 27. Thus the anchoring portion provides a complete seal outboard of the stub shaft which is not subject to wear due to rotation of the shaft.

Any type of handle may be used to operate the valve disc. One type of handle suitable for this purpose is shown in part in FIG. 1. While the disc may be used to regulate the amount of flow through the valve, its most common use will be to shut off flow through a line and in this service the disc will normally have two operative positions, that is, full open and full closed. Accordingly, the handle of FIG. 1, indicated generally at 61, is provided with a spring loaded plunger 67 which is reciprocable longitudinally of the handle to move from a position in which the plunger is received within one of the sockets 66 in the valve body to a second position in which the plunger is completely withdrawn from the socket. Sockets 66 are arranged so that one socket is parallel to the flow passageway and the other socket is transverse of the passageway. Thus plunger 67 will lock the disc in either the full open or the full closed position and is releasable to permit changing of the disc between these two extreme operating positions. The handle is provided with a pointer 65 which indicates the position of the disc.

The combination seat and seal element 16 is a tubular member formed of resilient material such as neoprene, rubber, hycar or other synthetics, the particular material being chosen so that the seal member will be sufficiently soft to function as a seal and a seat and be capable of a slight distortion necessary to mount the member in the valve body, yet of sufficient hardness to deliver the desired wearing quality. The tubular element 16 will be seen to include two annular radially spaced relatively thick concentric portions 42 and 27 joined together by an annular web 43. The inner portion 42, which may be referred to as the valve seat, has a bore 44 extending therethrough of slightly smaller diameter than the bores 12 and 13 through the body parts and when assembled in the valve, bore 44 forms a portion of the flow passageway through the body. Seat portion 42 is provided with identical flange portions 26 which are adapted to be received in the undercuts formed by lands and grooves 22 and 23 in the body elements to anchor the ends of the seat in the valve body against radial movement. The radially outermost portion 27 serves as an anchor and is received in the undercut portion of the body formed by lands 24 and grooves 25 to anchor the intermediate portion of the seat to the body against radial movement at that point.

When unassembled, the axial dimension of the seal element 16, that is, the distance between the endwise faces of the seal element, is slightly greater than the distance between the respective confronting lands and grooves in inner recesses 14 and 15. The radial dimension of the several components of the seal element should be approximately the same as the radial dimensions of the various lands and grooves in the body so that the seal element will readily slide into the lands and grooves of the body part but will tend to separate the body parts apart. Thus, as the body parts 10 and 11 are pulled into engagement with each other, the seal element will be placed under compression and will seal against loss of fluid through the seam between the body parts. It will be understood that the bore 44 through the seal element should have a diameter slightly less than the diameter of disc 17 which cooperates therewith to control flow of fluid through the valve.

Tubular element 16 according to this invention is provided with identical liner webs 45 and 46 which are preferably integrally formed with seat 43 and comprise axial extensions thereof, each liner web extending from the seat portion 42 away from the inner abutment faces of the body parts and toward the outer abutment faces 20 and 21, respectively, on the body parts. The webs are adapted to engage the bores 12 and 13 of the body parts and together with seat portion 42, provide a substantially continuous liner interposed between the valve body parts and material being passed through the valve. Each of the webs 45 and 46 are provided with bores 47 and 48, respectively, of substantially equal diameter and also of the same diameter as bore 44 of seat portion 42, whereby bores 47, 48 and 42 define the entire flow passageway through the valve body when the valve is assembled. That is, with webs 45 and 46 integrally formed with seat 42 as above described, bores 47, 48 and 44 essentially comprise one continuous bore through an integral body whereby the flow passageway thus formed is free from cracks or crevices. It will be seen that webs 45 and 46 may be of substantially smaller or thinner construction than seat portion 42 to permit the seal element to be distorted and mounted on the body parts during assembly of the valve, a thing not possible with the heavy anchoring flanges or beads employed in Patent No. 2,740,423.

The liner webs 45 and 46 preferably terminate at their ends in radially outwardly extending gasket elements 30 and 31, respectively. These gasket elements are concentric with the passageway through the valve and are carried in recesses 28 and 29, respectively, in the outer abutment faces 20 and 21 of the body parts. The depth of the recesses and the thickness of the gaskets are adjusted so that before being made up in a line, the gasket elements extend outwardly beyond the abutment faces 20 and 21. With this arrangement the gaskets will be placed under compression by the flange fittings when the valve is made up in a line to thereby provide a seal between the valve and the flanges. The outer ends of the gasket elements may be provided with anchor lips 49 and 50, respectively, which engage grooves 32 and 33 in the gasket recesses to thereby provide an additional anchoring means for retaining the seal element 16 against endwise movement in the valve body.

It is understood that gasket elements 30 and 31 and liner webs 45 and 46 may be comprised of the same material as element 16 and are relatively thin as compared to the combination seal and seat element 16. This is to permit distortion of these elements during assembly of the valve so they may be fitted to the body parts. In addition, it has been discovered that these elements need not be as heavy as element 16 in order to perform their functions of lining the valve, sealing between the valve and flanges, and anchoring the ends of the seat to place it under tension and thereby prevent pinching of the seat when the valve is operated. It will also be understood that the gasket elements and liner webs may be taken together and considered as a resilient tubular membrane which extends from the valve seat axially along the passageway through the valve and then radially outwardly therefrom and along the outer faces of the body parts.

Element 16 is also provided with opposed bores 51 and 52 of a slightly lesser diameter than the diameter of the valve stem 39 and opposed stub shaft 41 which are received in bores 51 and 52, respectively. Preferably, the axial dimension of anchor 27 is greater than the diameter of bore 51 so that anchor 27 will form a seal about the stem 39 radially outward from the valve seat, and in the event any fluid passes the seat portion 42 of the seal element, such fluid will be trapped by anchoring portion 27 and prevented from escaping. This feature will permit the anchor 27 to act as a complete auxiliary seal about the seat and will ordinarily insure that the useful life of the seal as a seat element will be completely utilized before it is necessary to replace the seal.

The valve is assembled by first distorting the combination seal and seat element 16 and attached liner web and gasket sufficient to insert the unitary valve disc and stem unit into the seal element. This is of course accomplished by first inserting stem 39 through bore 51 and then inserting stub shaft 41 into bore 52. The seal and attached liner webs and gaskets are then distorted sufficient to insert these elements into position in the body parts. The two halves of the body are then brought together and held in assembled relationship by bolts 34 which are recessed in counter sunk bores 35. This is all of the assembly necessary for the valve proper until it is made up in a flow line, at which time the bolts 20c on the flange fittings 20a and 20b utilized in mounting the valve in the flow line will additionally fasten the two halves of the body more securely together. When the body parts are thus drawn together, in addition to the sealing action above described at the interface of the body parts, a seal will be accomplished between the valve and flange fittings and the seal element will be anchored in tension at its ends through the cooperative action of the liner webs and the gasket elements to prevent pinching of the valve seat between the disc and body parts when the valve is operated.

From the above it will be seen that all of the objects of this invention have been accomplished. That is, a split-body valve is provided having a unitary stem and disc unit. In the embodiment herein shown, the valve seat is anchored near its ends and at a point intermediate its ends against radial movement inwardly toward the passageway through the valve when it is on suction service. A double seal has been provided at the interface of the body parts and around the valve stem. These and the other advantages and featuers of my valve in Patent No. 2,912,218 are retained.

In addition, a completely lined valve is provided without cracks or crevices which may trap and retain material which is being passed through the valve. Also, the valve seat is anchored against axial or sidewise movement to thereby prevent pinching of the valve seat between the disc and body parts. That is, through the cooperation of the liner webs and gasket elements, the seat is maintained under sufficient tension to prevent bunching of the seat ahead of the disc when it is operated. This anchoring of the seat is accomplished as follows. When the valve is made up in a line, the flange fittings are tightened against the gasket elements to compress the gaskets and thereby seal against loss of fluid between the valve and the flanges. Inasmuch as the gaskets are connected to the seat through the liner webs, the resilient action of the various elements operates to place the seat under tension. Since the seat is anchored against sidewise movement, it cannot be pinched between the valve disc and body parts when the valve is operated.

Although the invention has been described in connection with a valve of the type shown in my Patent No. 2,912,218, it will be understood that this is for purpose of illustrating a preferred embodiment of the invention and that the invention can also be used to advantage in any split-body valve wherein the valve seat is anchored intermediate its ends against radially inward movement.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

A disc valve comprising, a body divided into two opposed body parts, said body parts having registering bores therein forming a passageway through the body, an annular resilient seat in said passageway, said seat and the mutually opposed faces of said body parts having axially extending interengaging portions engageable by axial movement of each of said body parts and said seat relative to each other to anchor the seat in the body between and adjacent the interface of the body parts, a disc mounted for cooperation with the valve seat to control flow through the valve, and a tubular resilient membrane thinner and more flexible than and integrally joined to said seat and extending axially along said passageway and radially outwardly along the outer faces of said body parts whereby the bore in said seat and membrane form the flow passageway through the body and said membrane anchors the valve seat at the ends thereof to prevent pinching of the seat between the disc and body parts when the valve is operated and said membrane may be flexed to permit said seat to be inserted into said body parts by the above mentioned relative axial movement of said seat and body parts.

References Cited in the file of this patent
UNITED STATES PATENTS

| | | |
|---|---|---|
| 2,740,423 | Stillwagon | Apr. 3, 1956 |
| 2,912,218 | Stillwagon | Nov. 10, 1959 |